United States Patent
Coombes et al.

(10) Patent No.: US 10,122,455 B1
(45) Date of Patent: Nov. 6, 2018

(54) VLC/DLC SECTORIZED COMMUNICATION

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/965,521

(22) Filed: Apr. 27, 2018

Related U.S. Application Data

(63) Continuation-in-part of application No. 15/807,133, filed on Nov. 8, 2017, now Pat. No. 9,980,337, which is a continuation-in-part of application No. 15/643,244, filed on Jul. 6, 2017, now Pat. No. 9,949,331.

(60) Provisional application No. 62/655,586, filed on Apr. 10, 2018, provisional application No. 62/511,254, filed on May 25, 2017, provisional application No. 62/492,849, filed on May 1, 2017.

(51) Int. Cl.
  *H05B 33/08* (2006.01)
  *H04B 10/116* (2013.01)
  *H04L 29/08* (2006.01)

(52) U.S. Cl.
  CPC ......... *H04B 10/116* (2013.01); *H05B 33/089* (2013.01); *H05B 33/0854* (2013.01); *H04L 67/125* (2013.01)

(58) Field of Classification Search
  None
  See application file for complete search history.

(56) References Cited

U.S. PATENT DOCUMENTS

| | | | |
|---|---|---|---|
| 7,777,427 | B2 | 8/2010 | Stalker, III |
| 8,928,232 | B2 | 1/2015 | Aggarwal et al. |
| 9,084,308 | B2 | 7/2015 | Morrow |
| 9,980,337 | B1 | 5/2018 | Coombes et al. |
| 2006/0049935 | A1 | 3/2006 | Giannopoulos et al. |
| 2008/0218334 | A1 | 9/2008 | Pitchers et al. |
| 2008/0309259 | A1 | 12/2008 | Snijder et al. |
| 2011/0031897 | A1 | 2/2011 | Henig et al. |
| 2011/0122796 | A1 | 5/2011 | Simons et al. |

(Continued)

FOREIGN PATENT DOCUMENTS

| | | |
|---|---|---|
| WO | WO-2012131631 A1 | 10/2012 |
| WO | 2013057626 A2 | 4/2013 |
| WO | 2015032721 A1 | 3/2015 |

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.

(Continued)

*Primary Examiner* — Dedei K Hammond
(74) *Attorney, Agent, or Firm* — Moyles IP, LLC

(57) ABSTRACT

Sectorized Visual Light Communication (VLC)/Dark Light Communication (DLC) systems and sensors are generally disclosed. The exemplary VLC/DLC systems may include a transmitter for transmitting a light signal including information about the transmitting light source, and a receiver with a number of surface facets facing in different directions at different angles, and configured to determine a distance and a direction of a transmitting light source from the VLC/DLC receiver. Associated exemplary methods for automatic identification and grouping of light sources are disclosed.

20 Claims, 15 Drawing Sheets

(56) References Cited

U.S. PATENT DOCUMENTS

| | | |
|---|---|---|
| 2012/0072138 A1 | 3/2012 | Walters et al. |
| 2013/0193876 A1 | 8/2013 | Cleland et al. |
| 2013/0221203 A1 | 8/2013 | Barrilleaux |
| 2013/0221858 A1 | 8/2013 | Silberstein |
| 2014/0086590 A1 | 3/2014 | Ganick et al. |
| 2014/0265870 A1 | 9/2014 | Walma et al. |
| 2014/0336821 A1 | 11/2014 | Blaine et al. |
| 2014/0375217 A1* | 12/2014 | Feri ............... H05B 37/0272 315/151 |
| 2015/0130365 A1 | 5/2015 | Kim et al. |
| 2016/0366752 A1 | 12/2016 | Di Censo et al. |
| 2017/0094755 A1 | 3/2017 | Daranyi et al. |
| 2017/0245352 A1 | 8/2017 | Van Der Brug |
| 2017/0286889 A1 | 10/2017 | Yu et al. |
| 2018/0076891 A1* | 3/2018 | Agrawal ............. H04B 10/116 |

OTHER PUBLICATIONS

International Search Report of International App. No. PCT/IB2018/053013, dated Sep. 6, 2018, which is in the same family as U.S. Appl. No. 15/965,521, 4 pgs.

Written Opinion of International App. No. PCT/IB2018/053013, dated Sep. 6, 2018, which is in the same family as U.S. Appl. No. 15/965,521, 21 pgs.

International Search Report of International App. No. PCT/IB2018/053749, dated Sep. 27, 2018, which is in the same family as U.S. Pat. No. 9,980,337B1, 4 pgs.

International Written Opinion of International App. No. PCT/IB2018/053749, dated Sep. 27, 2018, which is in the same family as U.S. Pat. No. 9,980,337B1, 21 pgs.

\* cited by examiner

VLC/DLC SECTORIZED COMMUNICATION

CROSS REFERENCE TO RELATED APPLICATIONS

This application claims the benefit of U.S. Provisional Patent Application Ser. No. 62/655,586 filed Apr. 10, 2018. This application is also a continuation-in-part of U.S. patent application Ser. No. 15/807,133 filed Nov. 8, 2017 which claimed the benefit of U.S. Provisional Patent Application Ser. No. 62/511,254 filed May 25, 2017. U.S. patent application Ser. No. 15/807,133 is a continuation in part of U.S. patent application Ser. No. 15/643,244, which issued on Apr. 17, 2018 as U.S. Pat. No. 9,949,331, and claimed priority to U.S. Provisional Patent Application Ser. No. 62/492,849 filed May 1, 2017. The disclosure of each of the above applications is incorporated herein by reference in their entireties.

FIELD

Devices, systems, and methods for enabling light-based communication are generally described. In particular, exemplary devices, systems, and methods including one or more sectorized Visual Light Communication (VLC)/Dark Light Communication (DLC) transceivers/sensors for light-based communication are disclosed.

BACKGROUND

Visual light communication (VLC)/Dark light communication (DLC) is a preferred communication technique over Radio Frequency (RF) communication because of its high bandwidth and immunity to interference from electromagnetic sources. VLC refers to a visual illumination source which in addition to illumination can send information using the same light signal. The revolution in the field of solid state lighting leads to the replacement of florescent lamps by Light Emitting Diodes (LEDs) which further motivates the usage of VLC.

VLC(s) are an emerging form of communications that use visual forms of light emitters to communicate data wirelessly. VLC uses a light source that is frequency modulated, or uses a light source that is turned on and off rapidly when transmitting a communication. VLC systems employ visible light for communication that occupy the spectrum from 380 nm to 750 nm corresponding to a frequency spectrum of 430 THz to 790 THz. The low bandwidth problem in RF communication is resolved in VLC because of the availability of the large bandwidth. The VLC receiver only receives signals if they reside in the same room as the transmitter, therefore the receivers outside the room of the VLC source will not be able to receive the signals and thus, it has the immunity to security issues that occurs in the RF communication systems. As a visible light source can be used both for illumination and communication, therefore, it saves the extra power that is required in RF communication. Inherent features of VLC include high bandwidth, no health hazard, low power consumption and non-licensed channels that made it attractive for practical use.

Some of the applications using VLC are: Light Fidelity (Li-Fi); Vehicle to vehicle communication; Underwater communication; Hospitals; Information displaying signboards; Visible light identification (ID) system; Wireless local area networks (WLANs), Dimming; etc.

VLC-enabled LED luminaires, in addition to infrared (i.e., non-visual or DLC)-enabled luminaires, and synchronization protocols have enabled inexpensive white LEDs to be time division multiplexed to avoid packet collisions during communication. Luminaires use token message passing to regulate packet transmission.

Fundamentally, modulating light requires changes of light intensity. For the last century, incandescent lamps have been the primary source of light, but incandescent light cannot comply with high speed modulation because of the mechanism it uses to generate light. Incandescence is the effect of emitting thermal radiation from matter as a result of its temperature. In an incandescent light bulb, a wire is heated by running a current through it, and the resistance of this wire forms kinetic energy which is released in the form of light. This means that intensity control of incandescent lamps takes place through at least two steps (i.e., heating the wire and releasing light in the form of heat energy), resulting in indirect control of the signal. This would not be a problem if the thermal inertia would not make the system too slow for high speed modulation, but it does.

VLC/DLC light is typically transmitted in all directions and a receiver must be able to see multiple light transmitters at the same time in larger and more complex systems. Further, the receivers are required to handle mesh network conditions, which drops the capacity of a communication system. For at least the above reasons, VLC/DLC devices, systems, and methods that limit at least one of the receiver or transmitter are needed. In an aspect, the devices, systems, and methods may enhance or maximize the information bandwidth for a VLC/DLC communication system.

BRIEF DESCRIPTION

The disclosure relates generally to sectorized Visual Light Communication (VLC)/Dark Light Communication (DLC) sensors. In one or more exemplary embodiments the VLC/DLC sensors may include a plurality of surface facets, wherein each facet is oriented with a specific direction and angle with respect to the sectorized VLC/DLC sensor and other facets of the sectorized VLC/DLC sensor, wherein each facet includes a distribution of pixels within a photosensitive area of the facet, and the sectorized VLC/DLC sensor is configured to determine a direction and a distance of a transmitting light source from the sectorized VLC/DLC sensor, based at least in part on the pixels at which light transmitted from the transmitting light source is received and the intensity of the light that is received by the pixels.

In another aspect of the exemplary disclosed embodiments, a system incorporates an exemplary VLC/DLC sensor according to the disclosure. The system may be configured for automatic luminaire location identification and group assignment. One or more exemplary systems may include an exemplary sectorized VLC/DLC sensor according to the disclosure, wherein the sectorized VLC/DLC sensor receives at pixels light that is transmitted from a transmitting light source. The system may further include a gateway for controlling illumination of at least one luminaire, wherein the gateway is in data communication with a server and information regarding the pixels at which the light transmitted from the transmitting light source is received and the intensity of the light that is received by the pixels is transmitted to the server, and the server is configured to determine a location of the transmitting light source based at least in part on the information regarding the pixels at which the light transmitted from the transmitting light source is received and the intensity of the light that is received by the pixels.

In another aspect of the exemplary disclosed embodiments, a method of automatic luminaire location identification and group assignment incorporates an exemplary VLC/DLC sensor according to the disclosure. One or more exemplary methods may include receiving at an exemplary VLC/DLC sensor according to the disclosure light transmitted from transmitting light source, transmitting to a gateway information regarding pixels of the VLC/DLC sensor at which the light transmitted from the transmitting light source is received and the intensity of the light that is received by the pixels, transmitting to a server the information regarding the pixels at which the light transmitted from the transmitting light source is received and the intensity of the light that is received by the pixels, and determining with the server a location of the transmitting light source based at least in part on the information regarding the pixels at which the light transmitted from the transmitting light source is received and the intensity of the light that is received by the pixels.

BRIEF DESCRIPTION OF THE FIGURES

The above and still further features and advantages of embodiments of the present disclosure will become apparent upon consideration of the following detailed description of embodiments thereof, especially when taken in conjunction with the accompanying drawings, wherein.

Figure 1:
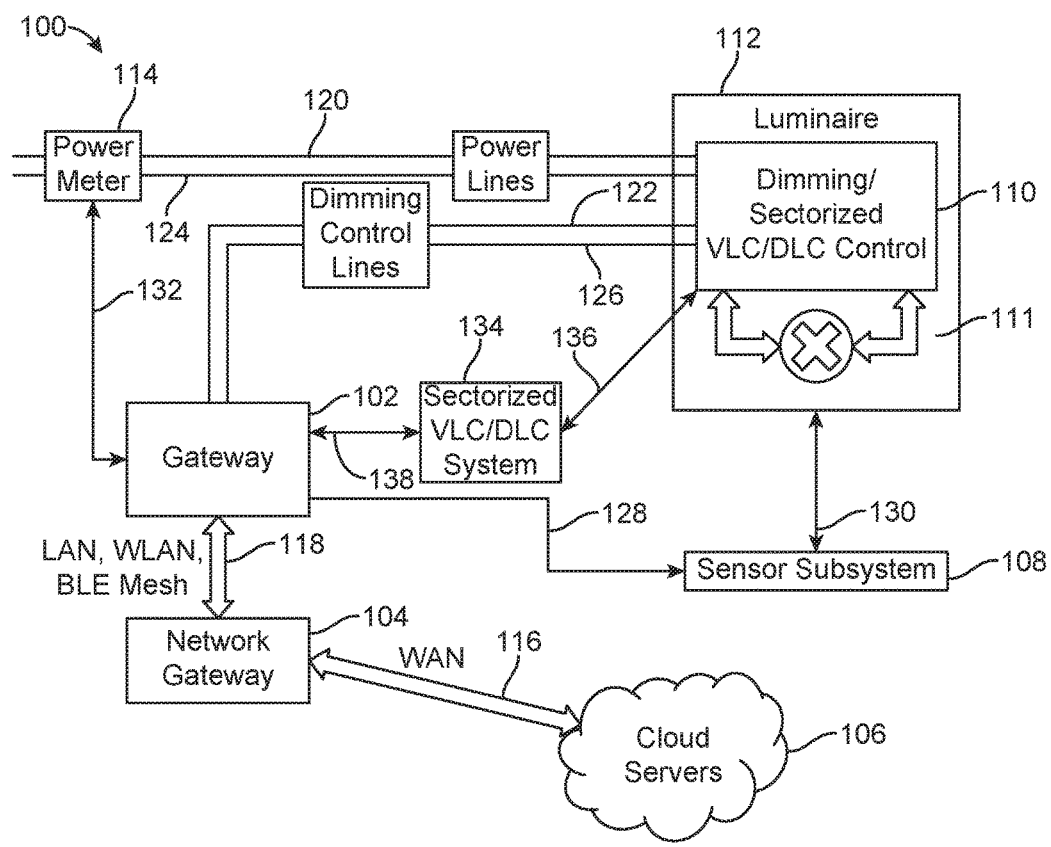
FIG. 1 is a high-level diagram of a system according to an exemplary embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used where possible, to designate like elements common to the figures.

DETAILED DESCRIPTION

Embodiments of the present disclosure relate generally to devices, systems, and methods for automated luminaire identification. The devices, systems, and methods facilitate automatic luminaire identification (e.g., unique network addresses) for commissioning a lighting control. Additionally, the exemplary disclosed embodiments provide dimming control, and facilitate ease of system integration associated with the vast size of required system, as well as ease of use and installation of such systems.

For purposes of this disclosure, the phrases "devices," "systems," and "methods" may be used either individually or in any combination referring without limitation to disclosed components, grouping, arrangements, steps, functions, or processes.

Exemplary disclosed embodiments according to the present disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participate in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magnetooptical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and prior art-recognized equivalents and successor media, in which the software implementations of the present disclosure are stored.

According to an aspect and with reference to FIG. 1, a system 100 for communication using at least one sectorized VLC/DLC device/system is described. The exemplary system 100 includes at least one of a plurality of luminaires 112 and/or at least one of a plurality of LEDs 111, at least one sectorized VLC/DLC system 134 such as a VLC/DLC transceiver or sensor, at least one sensor subsystem 108, a dimming/sectorized VLC/DLC control 110 (such as a dimming control driver), at least one gateway 102 (such as a Universal Smart Lighting Gateway (USLG)), at least one cloud server 106, and at least one network gateway 104. In various exemplary embodiments, the luminaire 112 may be a single luminaire or multiple luminaires connected with a single common interface to power lines 120, 124 and dimming control lines 122, 126. For purposes of this disclosure, the term "luminaire" refers generally and without limitation to a lighting source, device, system, structure, or other such unit including a light source (such as an LED), installation components, electrical and control components, and the like. The gateway 102 may be capable of discovering the dimming control protocol(s) installed in each associated luminaire 112 and controlling the dimming level(s) of those luminaires 112. For example, the gateway 102 may control power to the luminaire 112 and thereby dim the luminaire 112 to a corresponding dimming level between 0% (maximum brightness) and 100% (minimum brightness), or shut off the luminaire 112 completely.

The luminaire 112 is connected by connection 130 to one or more sensors found in the at least one sensor subsystem 108. The sensor subsystem 108 may be connected also to the at least one gateway 102. The gateway 102 in the exemplary embodiment shown in FIG. 1 is a device that is configured to, among other things, control and communicate with the luminaire 112.

The sensor subsystem 108 may include at least one color sensor and at least one environment sensor. In an exemplary embodiment, the at least one color sensor is an up looking sensor that faces the luminaire(s) 112/LEDs 111 to directly measure at least one of an actual color content and light intensity of the luminaire(s) 112 at the luminaire 112. The up looking sensor allows the gateway 102 to modulate or encode the transmitting for the specific luminaire 112, for example to control a dimming level and/or protocol of the luminaire 112. The at least one environment sensor faces away or in a downward direction from the luminaire(s) 112 and senses aspects of the environment in which the luminaire(s) are installed. For purposes of this disclosure, an "environment" is generally and without limitation a space, area, room, or other region. The at least one environment sensor includes at least one of an ambient light sensor, orientation sensor, movement detection sensor, and a temperature sensor. According to an aspect, a power meter 114 may be connected electrically between the gateway 102 and the luminaire 112 and may be connected electrically to the luminaire 112 via the power lines 120, 124. The power meter 114 may be connected to the gateway 102 via the power meter interface 132.

As illustrated in FIG. 1, the sensor subsystem 108 connects via connection 130 to the luminaire, and via a sensor interface 128 to the at least one gateway 102. The at least one sensor subsystem 108 detects information related to the system 100 and the luminaires 112 by detecting current conditions of at least one of the luminaires 112. In the exemplary embodiment, the sensor subsystem 108 includes one or more environment sensors to sense and capture environmental data and human activities such as motion, direction, footfall (i.e., the number of people moving through a given space over a given period of time), ambient light level and temperature, operating temperature, humidity, etc. The sensor subsystem 108 of the exemplary embodiment also includes an up looking sensor such as a color sensor that faces a luminaire 112 directly and measures at least one of an actual color content and light intensity of the luminaire 112 at the luminaire 112. The gateway 102 communicates and controls the diming level of the luminaire 112 and receives power consumption information from power meter 114. The gateway 102 and/or server 106 may use the power consumption information from power meter 114, among other things, to determine a transmission power of the luminaire 112. Thus, all of the noted operating aspects, among others, of the luminaires 112 can be known at any given time. The information or data from the power meter 114, sensor subsystem 108, and/or other system components is relayed either wirelessly or by wired connections to the gateway 102 and/or server 106 either directly or via the gateway 102. The information or data is ultimately provided to the cloud server 106 for storage and processing according to this disclosure. The server 106 is a cloud server in the exemplary embodiment shown in FIG. 1. In the same or other embodiments, the server 106 may be a local server, dedicated server, or other device or devices capable of, e.g., the processing and/or storage functionality consistent with this disclosure. The sensor subsystem 108, power meter 114, and other components of the system 100 may collect and transmit this data in real time. For purposes of this disclosure, the term "real time" generally means substantial concurrency without any particular timeframe or limitation.

The at least one sectorized VLC/DLC system 134 is physically or wirelessly/remotely connected to the at least one gateway 102 via connection 138 on one side, and to the at least one luminaire 112/LED 111 via connection 136 on other side. The at least one sectorized VLC/DLC system 134 includes at least one transmitter such as at least one LED as light source, and at least one receiver such as at least one photo detector or sensor, wherein said photo detector or sensor may include a camera, photodiode and phototransistor, and LED. The sectorized VLC/DLC receiver converts an analog light signal or data as received from a VLC/DLC transmitter to digital values using, in an exemplary embodiment, three modules: (1) a light sensor to measure the intensity of the received light; (2) an amplifier to strengthen the sensor output; and, (3) an analog-to-digital converter to obtain digital values or data. The sectorized VLC/DLC receiver detects information related to the luminaires 112 by detecting current conditions of at least one of the luminaires 112 such as, for example, light intensity received at the VLC/DLC receiver from the luminaire 112 (and thereby a relative distance of the luminaire 112 from the VLC/DLC sensor 134 as described further below) and the direction of the luminaire 112 from which the light is received on a particular portion of the VLC/DLC sensor 134.

At the sectorized VLC/DLC transmitter side, light transmissions are used to identify either the luminaire 112 or associated data such as actual light intensity at the luminaire 112, and may be sent using various sectorized VLC/DLC modulation techniques. In an aspect, the data or information signal is mostly modulated using light intensity. In an embodiment, the modulation techniques include On-Off-Keying (OOK), Pulse Time Modulation (PTM), Pulse Amplitude Modulation (PAM), Frequency Shift Keying (FSK), Phase Shift Keying (PSK), Orthogonal Frequency Division Multiplexing (OFDM), and Quadrature Amplitude Modulation (QAM). Further, information (light) transmitted from a VLC/DLC transmitter may be used by a VLC/DLC receiver at which the transmitted information is received to identify a relative distance of the transmitting luminaire 112 from the VLC/DLC receiver 134. For example, a low light intensity received from a transmitting luminaire 112 (e.g., according to a range of light intensities from a plurality of luminaires 112 communicating with the same VLC/DLC receiver) may indicate that the luminaire 112 providing such low light intensity is relatively farther away from the VLC/DLC receiver than other luminaires 112 from which VLC/DLC receiver is receiving transmissions. On the other hand, a relatively high light intensity from the transmitting luminaire 112 may indicate that the luminaire 112 is closer to the VLC/DLC receiver.

The sectorized VLC/DLC sensor 134 is also a directional receiver which identifies the direction of the luminaire 112 from which light is received. The sectorized, directional receiver in the exemplary disclosed embodiments is geometrically shaped and may include multiple faces, or, "facets" (sensors) in one or more of a 2D surface, a semi 2D surface, a 3D surface, and a semi 3D surface. The receiver sensor includes pixels and, based on the pixels activated by light received from a luminaire 112, the sectorized receiver sensor identifies the direction of the luminaire 112 from which the information is received. The sectorized receiver sensors are located in a specific direction according to an angle of each sensor face/surface. Each of the faces/surfaces has angles to that specific direction, and hence the amount of light received at the angle of the faces/surfaces is less than directly received at the sensor, based on which the sectorized receiver sensor may gauge the direction of the luminaire. In addition, each of the facets of the VLC/DLC receiver in the exemplary disclosed embodiments may be configured to communicate with the other facets information regarding the pixels at which light is received and the intensity of the light that is received, such that each facet that receives light may further determine a distance, direction, and intensity at which light is striking the VLC/DLC receiver, and thereby identify the light source including transmitting light sources, ambient light, etc.

In an aspect, the use of the sectorized VLC/DLC system 134 may turn on a luminaire device 112 that may modulate a specific information or data at a specific light intensity, wireless signal power level, and/or frequency. The information or data is received by a VLC/DLC sensor 134 and used to identify the luminaire device 112, gauge the relative distance to the luminaire device 112, and identify a direction of the luminaire 112 from which the information is received. The information or data is relayed either wirelessly or by wired connection to the gateway 102 and/or server 106 either directly or via gateway 102. The server 106 stores and processes the information according to this disclosure. The included information also helps luminaire devices locate each other based on, for example, the relative distances and directions between each luminaire 112 and the VLC/DLC sensor 134 that received the information from each luminaire 112. The VLC/DLC transmitter can include in the directional sending or in the sectorized message to neighboring VLC/DLC sensor 134 receivers the sector identification so to provide the direction to which the transmitter is looking or facing.

According to another aspect of the exemplary disclosed embodiments, dimming levels of a luminaire 112 are used in the determination of a relative distance of the luminaire 112 from the VLC/DLC sensor 134. For example, when the transmitting luminaire 112 is transmitting at multiple dimming levels, the dimming level associated with a particular transmission is included as part of the transmission message information. The sectorized VLC/DLC receiver 134 uses the dimming level to gauge a relative distance of the transmitting luminaire 112. As will be explained further below, up looking sensors as part of sensor subsystem 108 measure directly the light intensity of the luminaire(s) 112 at any dimming level and may thereby normalize any differences detected between light intensities received at the VLC/DLC sensor 134 at different dimming levels. Information regarding the light intensity of the transmitting luminaire 112 may also be included in the transmission message. The transmission message may also include information regarding other luminaire devices, including relative dimming levels, locations, color contents, light intensities, etc., that have been previously received by the VLC/DLC receiver side of the VLC/DLC transmitter that is currently transmitting. The information or data is relayed to the gateway 102, which relays the information or data to the cloud server 106 for storage, processing, and the like.

According to additional aspects of the exemplary disclosed embodiments, the VLC/DLC transmitter message may also include information regarding other luminaire devices 112 and their respective relative distances and directions from the VLC/DLC receiver 134. All of this information may be forwarded to the server 106 which algorithmically determines a relative layout of neighboring luminaires 112 based on information from luminaires that communicate with a given VLC/DLC sensor (and associated luminaire) at, e.g., particular light intensities and frequencies. In the exemplary disclosed embodiments, the server may also place neighboring luminaires that communicate with the given luminaire 112/VLC/DLC sensor 134 at certain thresholds into groups.

In the exemplary embodiment shown in FIG. 1, the gateway 102 is configured to gather and communicate the sensor subsystem 108 output of the at least one of the plurality of luminaires 112 and the plurality of LEDs 111 and sectorized VLC/DLC 134 output to the cloud server 106. In an aspect, the gateway 102 may be capable of detecting, communicating and handling/controlling a plurality of dimming protocols via the dimming/Sectorized VLC/DLC control device 110, and to control the dimming/Sectorized VLC/DLC control device 110 to provide a plurality of dimming levels to the luminaires 112. The output from the sensor subsystem 108 is to the cloud server 106 through the gateway 102 and network gateway 104 in the exemplary embodiment. The cloud server 106 may be configured to communicate information to a user device and/or interface (not shown) and provide updates and statuses of the luminaires 112 in each group/environment via associated gateways 102, sensor subsystems 108, etc. In addition, the gateway 102 may be configured to remotely receive control functions directly from the user device or via the cloud server 106 in various embodiments.

In another aspect of the exemplary disclosed embodiments, the cloud server 106 is configured to generate a real map or floor plan of luminaires 112 or lighting system components using data acquired from the at least one light sectorized communication/VLC/DLC system 134 and/or sensor subsystem 108, where all luminaire devices are located relative to the VLC/DLC system 134 and associated luminaire 112, thus creating location identification without knowing the group(s) to which all (or neighboring) luminaires belong. The data acquired from the at least one sectorized VLC/DLC system 134 and/or sensor subsystem 108 includes, among other things, relative distances and directions of each luminaire 112 from which light is received at the VLC/DLC sensor 134 and actual light intensity of each luminaire 112 at the luminaire (via up looking color sensor in the exemplary embodiments).

Figure 3:
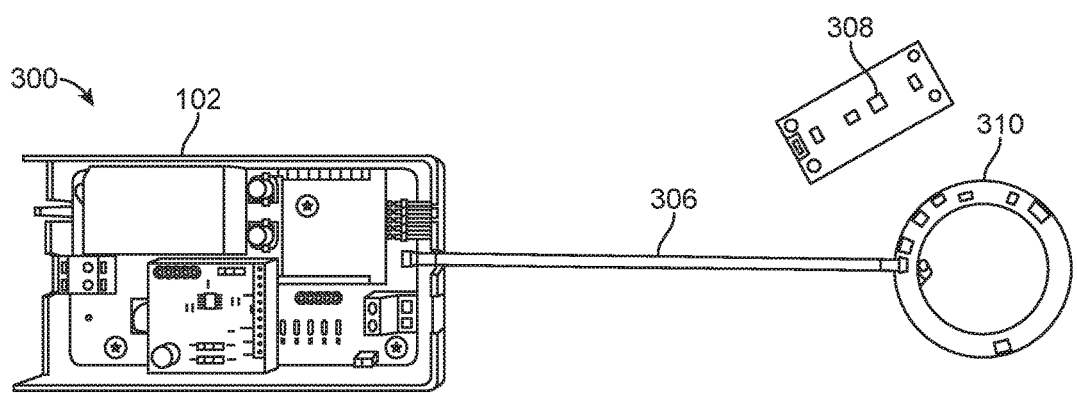
FIG. 3 is a perspective view of a sensor connection to a gateway, according to an aspect.

According to an aspect, the connection 130 to the luminaire 112 in the exemplary disclosed embodiments (such as shown in FIG. 3) is physical and is not limited to a specific location. In the same or other embodiments, one or more connections may be wireless. The location of the sensor subsystem 108 may be different for various types of sensors that are to be positioned. As seen in FIG. 3, for instance, physical sensor interfaces (306) and connections may include the sensor interface (such as 128 in FIG. 1) connected to the gateway 102. The gateway 102 is capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors. The connections can be as simple as analog interface connectors and/or electrical/digital bus connectors of any kind.

According to an aspect and with reference to FIG. 1, the system 100 further includes a backhaul interface 118 connected to the gateway 102 and the network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect, the gateway 102 is connected with the network gateway 104, which resides between the local networks to a Wide Area Network (WAN) 116. In an embodiment, the WAN 116 connects the gateway 102 to the cloud computers/servers 106 for operational and management interfaces.

In an embodiment, the at least one embedded sectorized VLC/DLC system interface with light sensitive CMOS image sensor(s) receives one or more colors from one or more pixels, and is thereby configured to sense/measure light intensity of the transmitting luminaire 112 and relative power of the received signal, and to identify the direction of the light from which the information is received, and said data is relayed to the at least one gateway 102 and the at least one server 106. In an embodiment, one set of pixels in the at least one embedded sectorized VLC/DLC receiver receives the data/information/message where the light intensity is high on a particular center and direction of light, and another set of pixels in the at least one embedded sectorized VLC/DLC receiver does not receive the data/information/message, i.e., where the light intensity is zero on a particular center and direction of light.

In certain embodiments, the sectorized VLC/DLC receiver under static conditions (i.e., unchanging conditions such as which luminaires are transmitting, the level of interference affecting the transmissions, the modulation technique associated with the transmission(s), the frequency and channel coding for the transmissions, etc.) enables sectorized communication by generating and keeping a static map of the identity and location of each transmitting luminaire according to each sector of the VLC/DLC receiver at which light from the respective transmitting luminaire is received. In the same or other embodiments, the mapping may be continuously or periodically performed in real time to detect and compensate for dynamic (changing) conditions such as which luminaires are currently transmitting and the levels of transmission interference. The VLC/DLC receiver may adjust for changing conditions, for example by changing the transmission channel coding when a certain level of transmission interference is experienced. Thus, the VLC/DLC receiver may be capable of generating and keeping one or more dynamic maps of the identity and location of transmitting luminaires. The static mapping, dynamic mapping, or a combination thereof may be used to route information to the luminaires.

In certain embodiments, a mobile device including a sectorized VLC/DLC receiver/transmitter enables sectorized communication by at least one of static mapping, dynamic mapping, or a combination thereof as described above. For example, the mobile sectorized VLC/DLC receiver may generate a dynamic map of the identity and location of transmitting luminaires by hand-offs of the mobile VLC/DLC receiver from one location/group of transmitting luminaires to another and according to each sector of the VLC/DLC receiver at which light from each transmitting luminaire is received while the mobile VLC/DLC receiver is moving. This mapping information is dynamically generated in real time as the device is moving relative to the transmitting luminaires. This mapping information may be used, for example, to route information to the luminaires.

Figure 2:
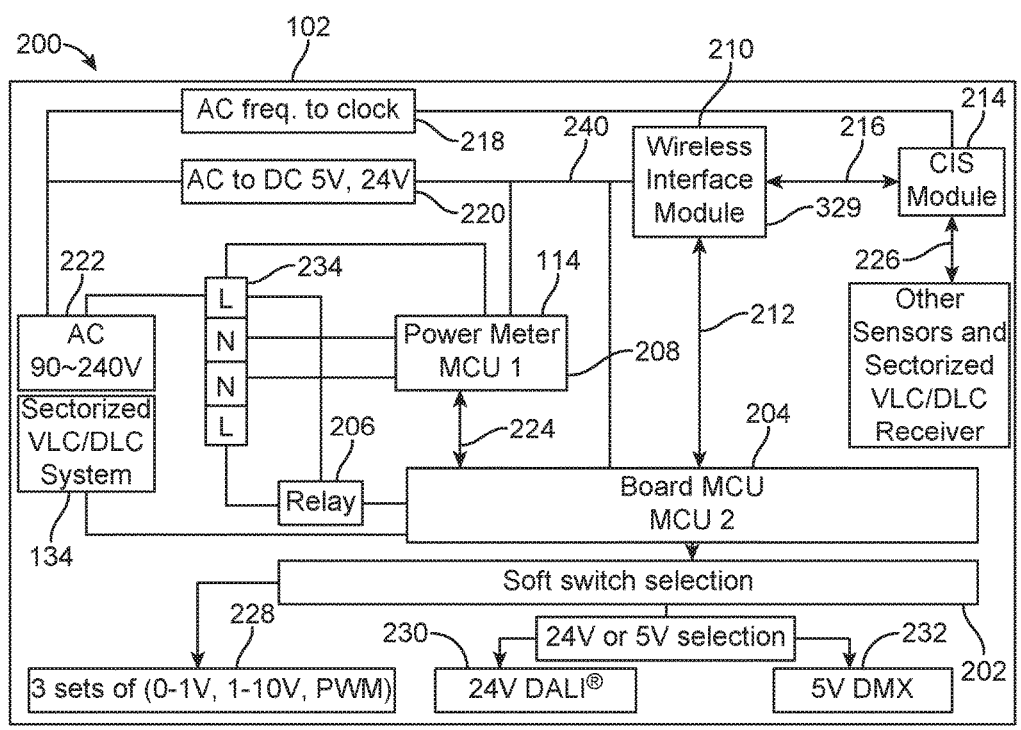
FIG. 2 is a gateway box diagram according to an exemplary embodiment.

FIG. 2 depicts the gateway 102 in further detail. According to an aspect, a soft switch 202 to select between different electrical dimming interfaces is provided. The soft switch 202 may be actively used to search for the correct protocol between the gateway 102 and the luminaire 112 (not shown in this figure). The luminaire 112 may be a dimming luminaire 112. According to an aspect, protocol modules 228, 230, and 232 are the software implementation of the dimming interfaces that reside in the gateway 102. In an embodiment, the supported dimming protocol include several sets of protocols, such as, for example, 0V-10V, 1V-10V, PWM 228, protocols over 0V-10V and/or 1V to 10V, a 24V DALI® 230 protocol, and a 5V DMX 232 protocol. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. According to an aspect, MCU-2 204 is also connected to a sectorized VLC/DLC system 134, where the information is relayed to the MCU-2 204. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (for example, FIG. 1). In an embodiment, the WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environmental sensor and a Red, Green, Blue (RGB) sensor combination device. Other exemplary color sensors may be, for example, Yellow, Red, Green, Blue (YRGB) sensors or any other color sensors consistent with this disclosure. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2, and according to an aspect, provides the physical electrical line connections.

The power meter 114 connections are described in further detail, with reference to FIG. 2. The power meter 114 may be connected to an input line of the luminaire 112 (as shown in FIG. 1), in such a way that the power meter 114 measures electrical power drawn by the luminaire 112 at any given moment in real time. According to an aspect, the power meter 114 is connected to the gateway 102 to provide real time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used. The power meter and connection may be any known power meter and/or connection within the spirit and scope of this disclosure.

Figure 3A:
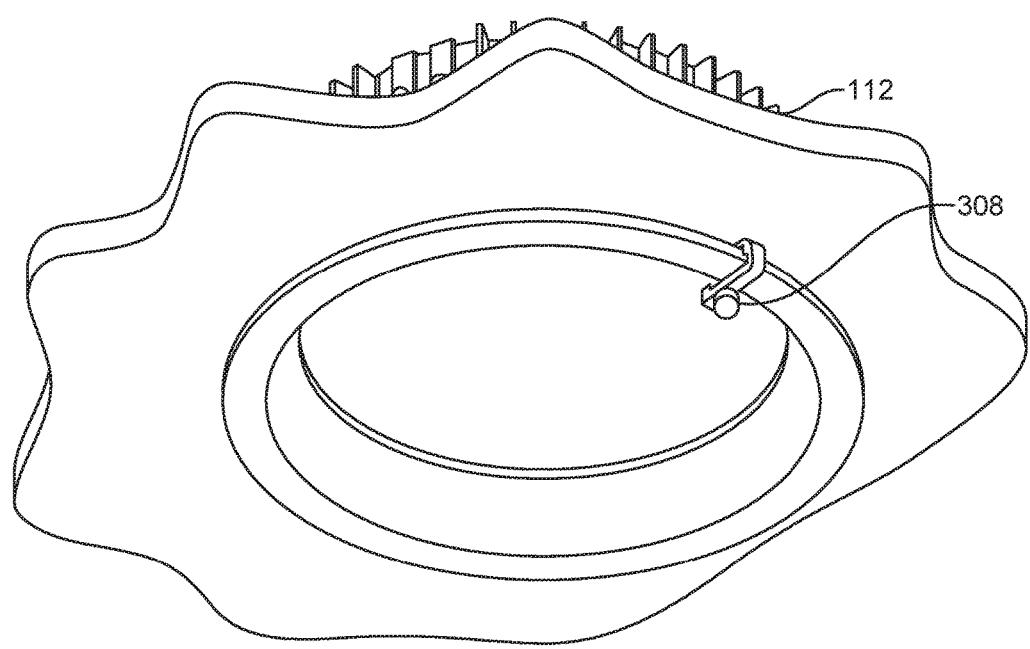
FIG. 3A is a perspective view of a sensor connection to a luminaire, according to an aspect.

With reference now to FIG. 3A, a perspective view of a simulated VLC/DLC receiver 308 that is attached to a luminaire 112 is shown. For purposes of this disclosure, a "simulated VLC/DLC receiver" refers to a VLC/DLC receiver that may not have sectorized, angular facets according to other exemplary disclosed embodiments of a sectorized VLC/DLC receiver as explained in detail with respect to FIGS. 4A-5, but behaves as a sectorized VLC/DLC receiver at least because it uses light intensity received at different pixels incorporated in the VLC/DLC receiver (see FIG. 5) to determine at least one of a distance and a location of a transmitting luminaire. The exemplary simulated VLC/DLC receiver shown in FIG. 3A has a half-dome shape.

With additional reference now to FIG. 3, and according to an aspect of the exemplary embodiment(s), the gateway/sensor system 300 may include one or more sectorized VLC/DLC sensors, such as the sectorized VLC/DLC sensors 318, 328, 338, 348, 358 shown in FIGS. 4A-4E, typically configured as CIS modules 308, 310 (FIG. 3) connected to the gateway 102. According to an aspect, and as illustrated in the exemplary embodiments shown in FIGS. 4A, 4B, 4C, 4D and 4E, the gateway/sensor system 300, 400 may include one or more sectorized VLC/DLC sensors 318, 328, 338, 348, 358, typically configured as CIS modules, connected to the gateway 102. Each sectorized VLC/DLC sensor 318, 328, 338, 348, 358 has a geometric shape and operates as a sectorized VLC/DLC receiver configured as multiple faces in one or more of a 2D surface, a semi 2D surface, a 3D surface, and a semi 3D surface. Each of the VLC/DLC receivers includes receiving pixels which are configured to identify the direction of a transmitting luminaire from which a light transmission is received. For example, each sectorized VLC/DLC receiver sensor is located in specific direction. Each of the faces/surfaces has an angle to that specific direction, and hence the amount of light received at a particular face/surface may be less than actually received at the VLC/DLC sensor 318, 328, 338, 348, 358, based on which the sectorized VLC/DLC receiver may determine the direction of the transmitting luminaire.

Figure 4A:
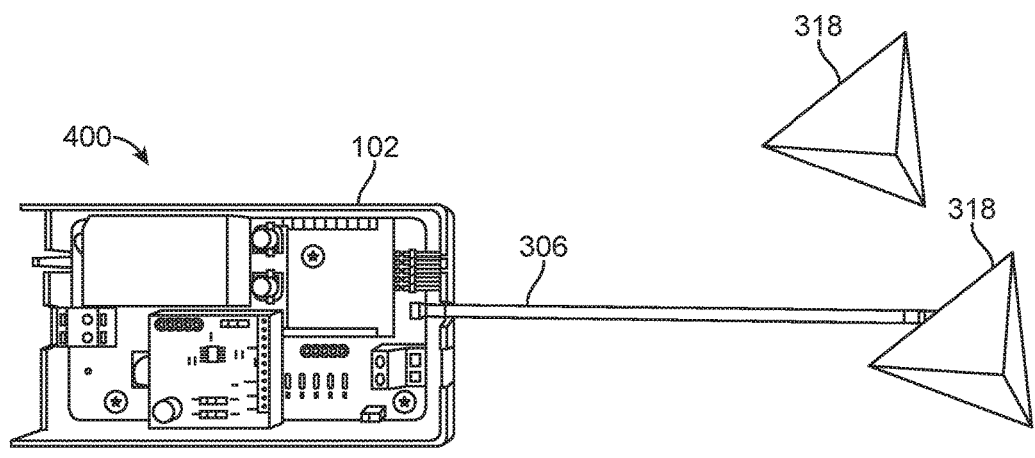
FIG. 4A is a perspective view of a triangular-based pyramid shaped directional sensor connection to a gateway, according to an aspect.
Figure 4B:
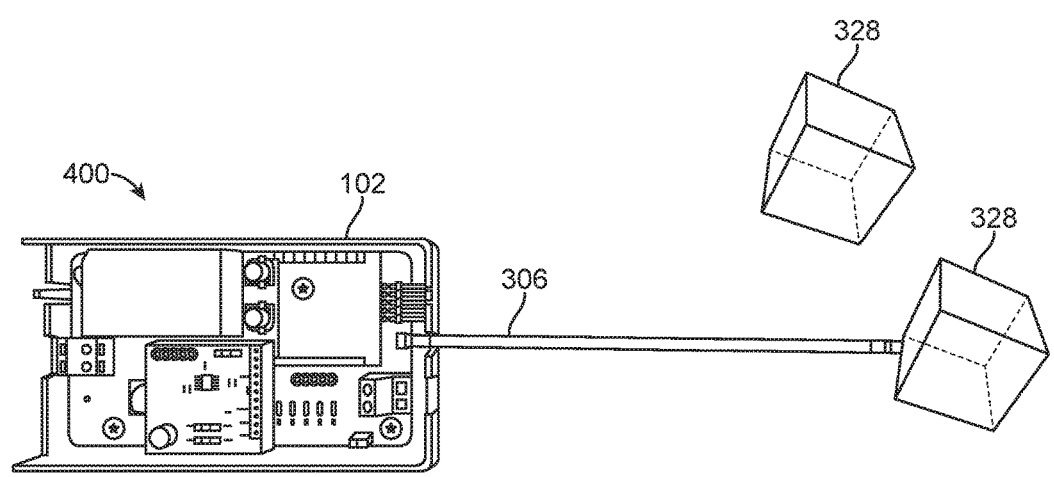
FIG. 4B is a perspective view of a cube shaped directional sensor connection to a gateway, according to an aspect.
Figure 4C:
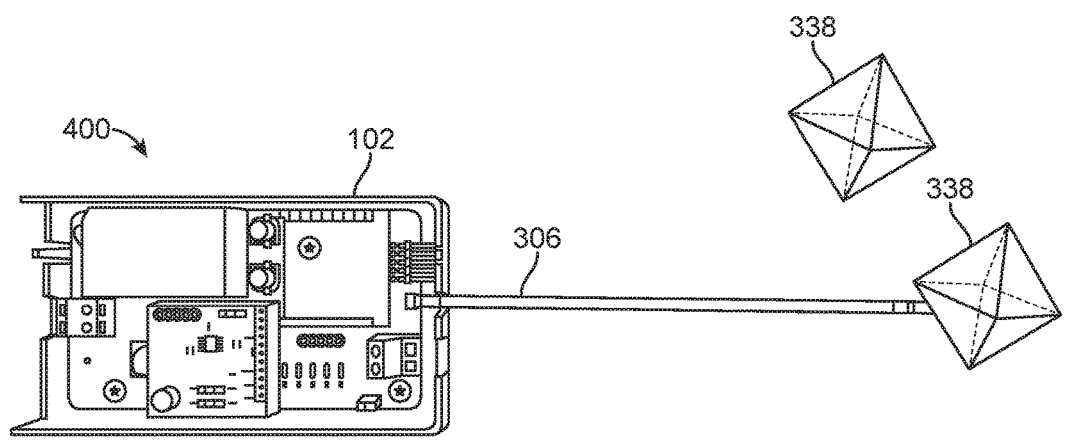
FIG. 4C is a perspective view of a square-based pyramid shaped directional sensor connection to a gateway, according to an aspect.
Figure 4D:
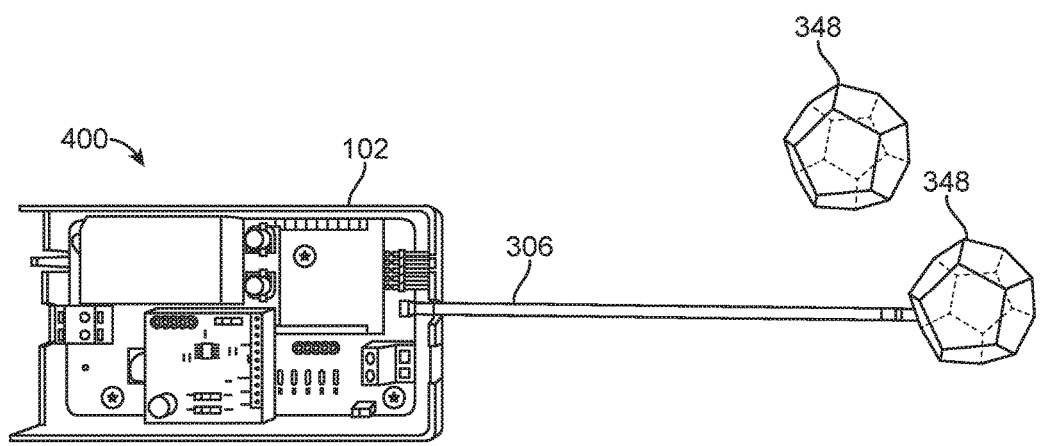
FIG. 4D is a perspective view of a dodecahedron shaped directional sensor connection to a gateway, according to an aspect.
Figure 4E:
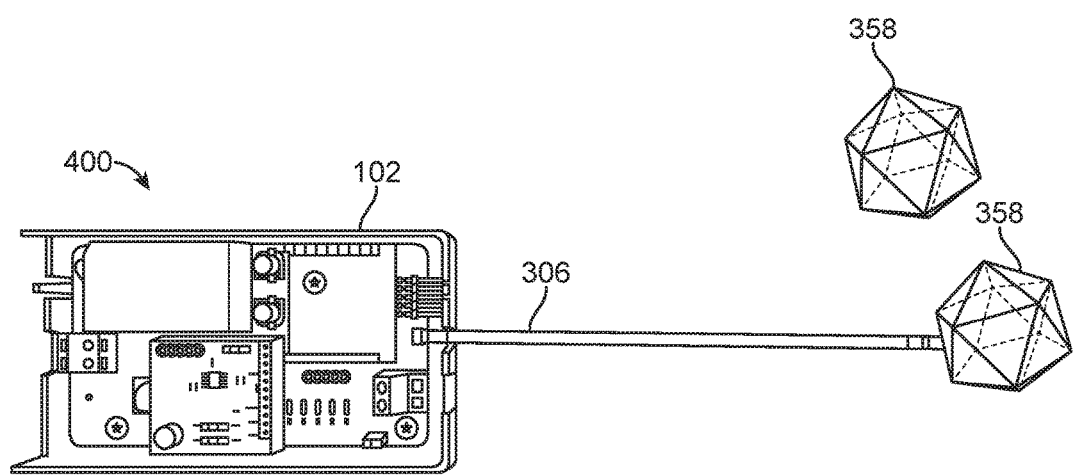
FIG. 4E is a perspective view of an icosahedron shaped directional sensor connection to a gateway, according to an aspect.

In the exemplary embodiment shown in FIG. 4A, the sectorized VLC/DLC sensor is a triangular-based pyramid shaped directional sensor 318 which identifies the direction of the luminaire 112 from which the light transmission/information is received. In an embodiment, and as shown in FIG. 4B the sectorized VLC/DLC sensor is a cube shaped directional sensor 328 which identifies the direction of the luminaire 112 from which the light transmission/information is received. In an embodiment, and as shown in FIG. 4C the sectorized VLC/DLC sensor is a square-based pyramid shaped directional sensor 338 which identifies the direction of the luminaire 112 from which the light transmission/information is received. In an embodiment, and as shown in FIG. 4D, the sectorized VLC/DLC sensor is a dodecahedron shaped directional sensor 348 which identifies the direction of the luminaire 112 from which the light transmission/information is received. In an embodiment, and as shown in FIG. 4E, the sectorized VLC/DLC sensor is an icosahedron shaped directional sensor 358 which identifies the direction of the luminaire 112 from which the light transmission/information is received. In other embodiments, the sectorized VLC/DLC sensor may take any configuration consistent with this disclosure.

Each of FIGS. 3, 4A, 4B, 4C, 4D and 4E illustrate an embodiment that includes at least one of a first CIS module 308 and a second CIS module 310 (FIG. 3) which are shown in FIGS. 4A-4E as or including sectorized VLC/DLC sensors 318, 328, 338, 348, 358. (Only one connection is actually depicted, although one or both of the sensors 308, 310 can be connected to the gateway 102 and may include any combination of sectorized VLC/DLC sensors and other CIS modules 308, 310). According to an aspect, the exemplary CIS modules/sectorized VLC/DLC receivers 308, 310, 318, 328, 338, 348, 358 may include a physical interface 306 with the gateway 102 via a TWSI connection that uses a 6 or 8 pin FPC cable and connector. A wireless connection is also possible. The CIS modules/sectorized VLC/DLC receivers 308, 310, 318, 328, 338, 348, 358 may be physically connected at any desired position on the luminaire 112 (not shown). In an embodiment and as shown in FIG. 3, the CIS module 308 is a linear module that can be adapted to fit on luminaires and/or devices that require a linear fitting. In an embodiment and as shown in FIG. 3, the CIS module 310 is circular, and may be designed to fit on luminaires and/or devices that require a circular-shaped fitting.

In exemplary disclosed embodiments, each of the CIS modules/sectorized VLC/DLC receivers 308, 310, 318, 328, 338, 348, 358 includes at least two sensors. A first sensor is an environment sensor and may be arranged such that it faces away from and/or extends in a downwardly fashion, from the luminaire 112. A second sensor may be a color sensor such as a Red Green Blue (RGB) or Yellow Red Green Blue (YRGB) sensor arranged such that it faces the luminaire 112 directly. The at least two sensors may be combined into a single Application Specific Integrated Circuit (ASIC) or may be arranged as separate devices. According to an aspect, the first and second sensors may also connect with the gateway 102. Each of the at least two sensors may provide real time measurements and assessments to the gateway 102. In response to the measurements and assessments provided, the gateway 102 may control the dimming device 110 and change the dimming level and a color temperature and RGB/RGBW (Red Green Blue Warm White) color, in devices that allow for color temperature and RGB/RGBW color control. Overall, the sensor subsystem 108 in combination with the power meter 114 and gateway 102 may capture various properties of the system, luminaire, and environment including, without limitation, 1) motion and direction of motion in the environment; 2) footfall; 3) ambient light level in the environment; 4) temperature and humidity in the environment; 5) light intensity, output, and operating temperature of the luminaire; 6) color content of the luminaire; 7) voltage and power consumption of the luminaire; and, 8) dimming level of the luminaire.

According to an aspect, the system 100 includes the RGB sensor directly facing the luminaire 112 (not shown). The RGB sensor may measure both the RGB content of the light source and the light intensity of the light source. According to an aspect, the RGB sensor or combination of sensors is configured to measure multiple color channels, as they directly face the luminaire 112. In an aspect, the RGB sensor may be a sectorized or non-sectorized sensor.

The environment sensor may be a low-resolution image/imaging sensor, such as an array of sensors combined into a low-resolution image/imaging device, or a single ASIC that is an imaging sensor. As used herein, a low-resolution image/imaging sensor refers to a sensor that typically contains less than approximately 1200 pixels, for example, and without limitation, a 32×32 sensor. For example, and without limitation, the sensor may be capable of detecting and determining how many human individuals or other objects are in an environment in which the sensor is installed and the position and orientation of each individual/object. However, the sensor may not have enough resolution to identify or distinguish the individuals/objects, especially at certain distances from the individuals/objects. According to an aspect, the environment sensor measures environmental parameters and faces away from or in a downward direction from the luminarie 112. The environment sensor is arranged to monitor the environment in which the luminaire(s) are installed. According to an aspect, the environment sensor may include at least three different types of sensors, such as a low-resolution image/imaging sensor, an ambient light sensor, and a temperature sensor. Without limitation, this disclosure refers to the three sensors included in the environment sensor collectively as an "environment sensor". In other embodiments, the environment sensor includes different environmental sensors. In other words, the environment sensor may include less or more sensors than described herein. Embodiments in accordance with the present disclosure can use other sensors and more types of sensors to sense the environment. According to an aspect, the environment sensor is a single sensor ASIC. The environment sensor may be generally any sensor that is capable of collecting information regarding an aspect of the environment in which the luminaire 112 is installed.

According to an aspect, the combination of the environment sensor and the color sensor is set into one of a single ASIC or a set of separate devices connected to the gateway 102. The sensors may be directed as follows: the color sensor faces the luminaires, and the environment sensor faces away from the luminaires in such a way that it monitors the environment. Real time measurements and assessments may be conveyed to the gateway by the sensors that make up the sensor subsystem.

According to an aspect, the environment and color sensors of the sensor subsystem are placed/connected on a fitting of the luminaire. The exact location of the sensors is not fixed, e.g., two different luminaires by the same manufacturer of the same type of fitting and LED specifications may be assembled such that the sensor location is different relative to the surface and dimensions of the fitting. Thus, the location of the color and environment sensors on the fitting is not limited. The requirement of placing the color and environment sensors on the fitting at specific locations is not limited by this disclosure.

Figure 5:
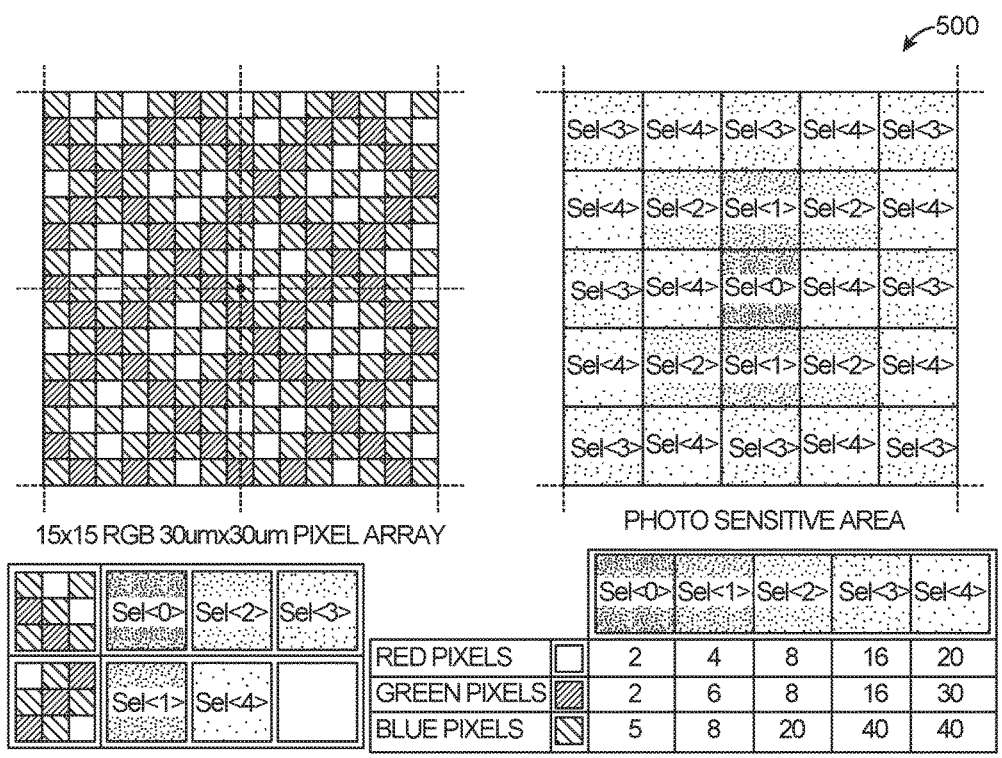
FIG. 5 is a diagram illustrating distribution of pixels, according to an aspect.

FIG. 5 is a diagram illustrating an exemplary distribution of color pixels in the photo sensitive area of the sectorized VLC/DLC receiver CMOS according to an embodiment. For example, pixels with respect to RGB color in the photosensitive area(s) have been illustrated. In an embodiment, the at least one embedded sectorized VLC/DLC system interface with light sensitive CMOS image sensor receives one or more colors from one or more pixels, and the system is configured to sense/measure light intensity of the light received at the pixels from a transmitting luminaire and the relative power of the received light signal. The system may further identify the direction of the light from which the light transmission/information is received. Data regarding the light transmission and/or transmitting luminaire is relayed to the at least one gateway 102 and/or the at least one server 106. In an embodiment, one set of pixels in the at least one embedded sectorized VLC/DLC receiver receives the transmitted light data/information/message where the light intensity is high on a particular center and direction of light, and another set of pixels in the at least one embedded sectorized VLC/DLC receiver does not receive the transmitted light data/information/message where the light intensity is zero on a particular center and direction of light. In an aspect, the exemplary sectorized VLC/DLC receiver may also distinguish between multiple transmitting light sources according to any or all of the pixels that receive light from each light source, the relative intensity of each light source as received at the pixels, and information in the light transmission regarding the transmitting light source.

Figure 6:
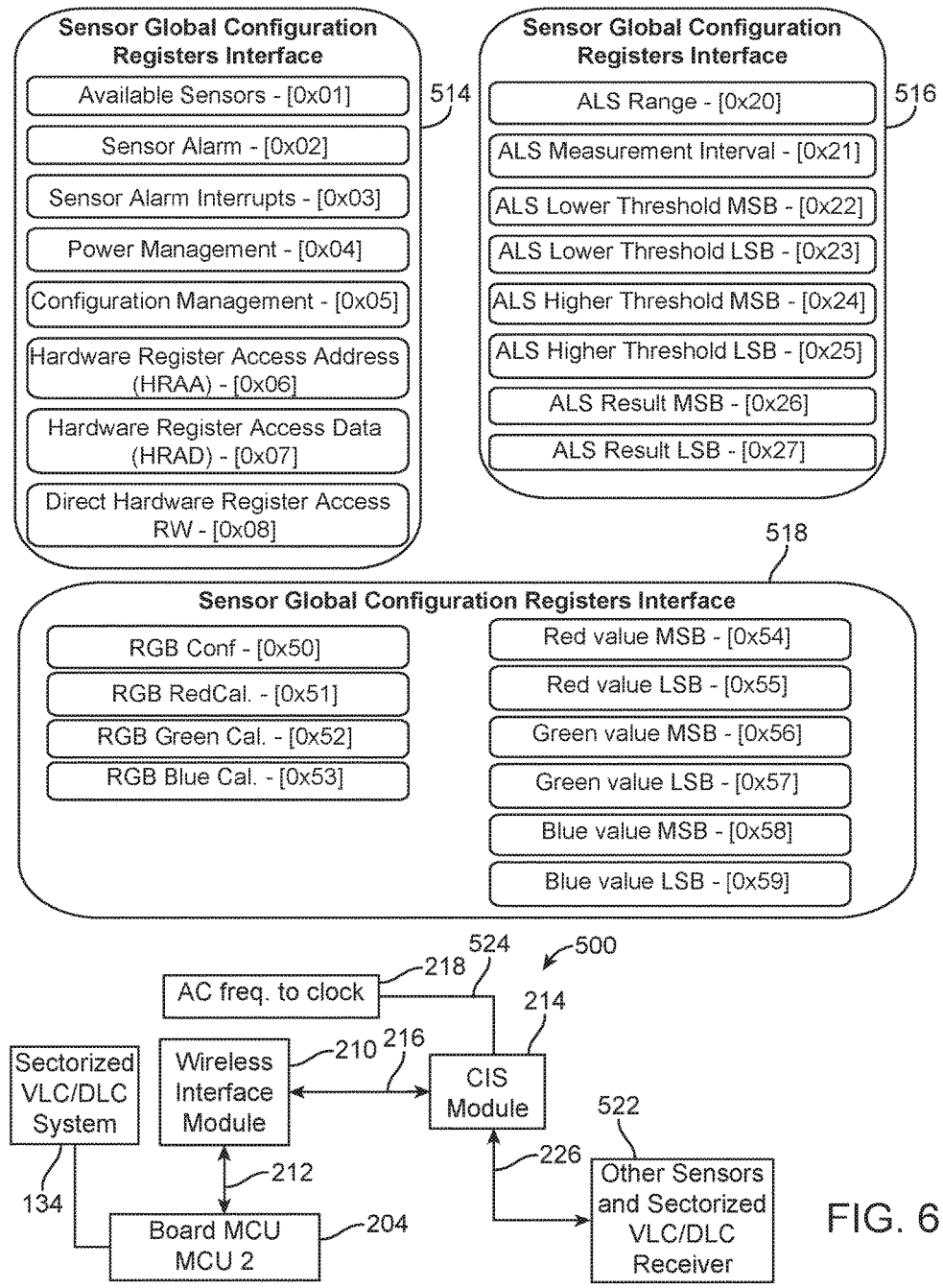
FIG. 6 is a diagram illustrating sensor registers, according to an aspect.

FIG. 6 illustrates an embodiment of a sensor interface data structure 400. According to an aspect, the sensor interface is the TWSI 216 (FIG. 2) that allows the use of memory mapped registers to communicate information between the WIM 210 and the CIS module 214. In turn, the WIM 210 may provide this information and receive directives from the Board MCU-MCU 2 204 via a SPI bus 212. The sensor module interface 212 may be distinct for each of the particular sensor devices 500 used in various configurations. As illustrated in FIG. 6, and according to an aspect, the sensor devices 500 may include multiple registers associated with any/all of its functions. FIG. 6 depicts some of the features to exemplify the data structure. In an embodiment, the interfaces 216, 226 within the sensor device are arrays of eight bit (8-bit) registers (see, for instance, Sensor Global Configuration Register Interfaces 514 and 516). Each may be mapped to a specific memory address on the WIM 210. In an embodiment, a plurality of interfaces 514, 516, 518 are provided to control the sensors 500. In the exemplary embodiment of FIG. 6, an example of a register, such as a Sensor Global Configuration Register Interface 514 is illustrated. The Sensor Global Configuration Register Interface 514 may be set as follows: the register in address 0x01 will turn on bits associated with available sensors on the module. If a sensor does not exist, its bit may be set to 0. Available sensors in this embodiment may be, for example and without limitation: Ambient Light Sensor ("ALS"), Motion detection based on PIR ("PIR"), RGB sensor ("RGB"), Motion detection and direction based on frame capture ("MOT"), LED Lumen sensor ("LL"), and Temperature sensor ("TEMP"). According to an aspect, the register address 0x02 is used as an alarm for the different sensors; e.g., one can set the value range so that when reached by the specific sensor the appropriate alarm bit in this register will turn to 1, or else it is 0. The register in address 0x03 may be used for resetting sensor alarms when this occurs. According to an aspect, the register in address 0x04 is used to power ON and/or OFF the entire sensors' system. The register in address 0x05 may be used for configuration management. Other known registers can be found in register addresses found in 0x06-0x08, as well as 0x20-0x27 and 0x50-0x59. Additional sensors would expand (or constrict) the registers.

Figure 7:
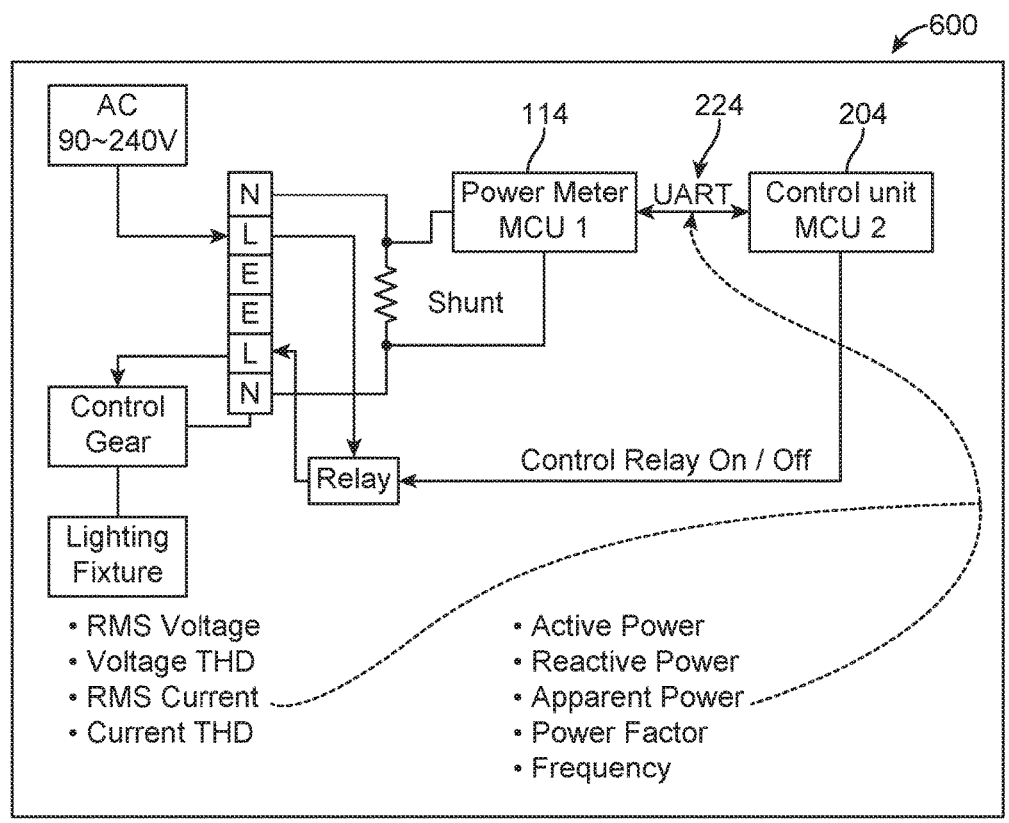
FIG. 7 is a diagram illustrating a power meter interface, according to an aspect.

FIG. 7 illustrates an exemplary embodiment 600 of the power meter 114 and associated configuration, which may be used in the system 100. A variety of known power meter 114 devices can be obtained from known sources. According to an aspect, the power meter 114 may be physically connected with and/or have physical connectivity within the USLG 102 (see, for example, FIG. 1). In one embodiment, the list of information that is communicated by the power meter 114 via the UART 224 includes, for example and without limitation: RMS Voltage, Voltage THD, RMS current, Current THD, Active Power, Reactive power, Apparent power, Power factor, and Frequency. Various mixed signal microcontrollers 204, such as those sold by Texas Instruments® under the Manufacturer's Code "MSP430I2041" may be used by the system 100 and are able to communicate with the power meter 114.

In general, aspects of the exemplary disclosed embodiments include a method for communication using sectorized VLC/DLC systems/sensors 134. The method may include, for example and without limitation, providing at least one luminaire and/or at least one LED and providing at least one sensor subsystem to sense and capture environmental data and data regarding the luminaire(s)/LED(s) in real time. In an exemplary embodiment, the plurality of sensors are connected to at least one gateway, which is capable of gathering and communicating the sensed data of the environment and luminaire(s)/LED(s) to, e.g., a server. The method may further include forwarding by the gateway information received from the sensor(s) along with power readings of the luminaire(s) over wired/wireless networks and via Wide Area Network ("WAN") to a server for further processing. The output or data from the sensors is fed to the server either directly or via the at least one gateway and a network gateway. The cloud server may communicate required data to a user device with a user interface, thereby enabling communication with the sectorized VLC/DLC sensors within the system or environment. A user may thus obtain information, updates, and status data regarding particular luminaires, or all luminaires in a particular environment or connected system, via the gateway. The gateway may also receive control functions or requests from the user device to, e.g., actuate the luminaires with control parameters from a remote location.

Other aspects of the exemplary disclosed methods include interfacing by the gateway with a plurality of other control systems and/or devices via at least a wired connection, an Ethernet connection, a wireless connection or a combination thereof. According to an aspect, the gateway may receive control functions from the user device to actuate the luminaires with control parameters from remote location via its interface. The interface may be a backhaul interface running a backhaul protocol such as in the exemplary disclosed system shown in FIG. 1. In an embodiment, the backhaul protocol may be responsible for delivering control functions to the gateway to actuate the luminaires with control parameters from remote location.

Figure 8:
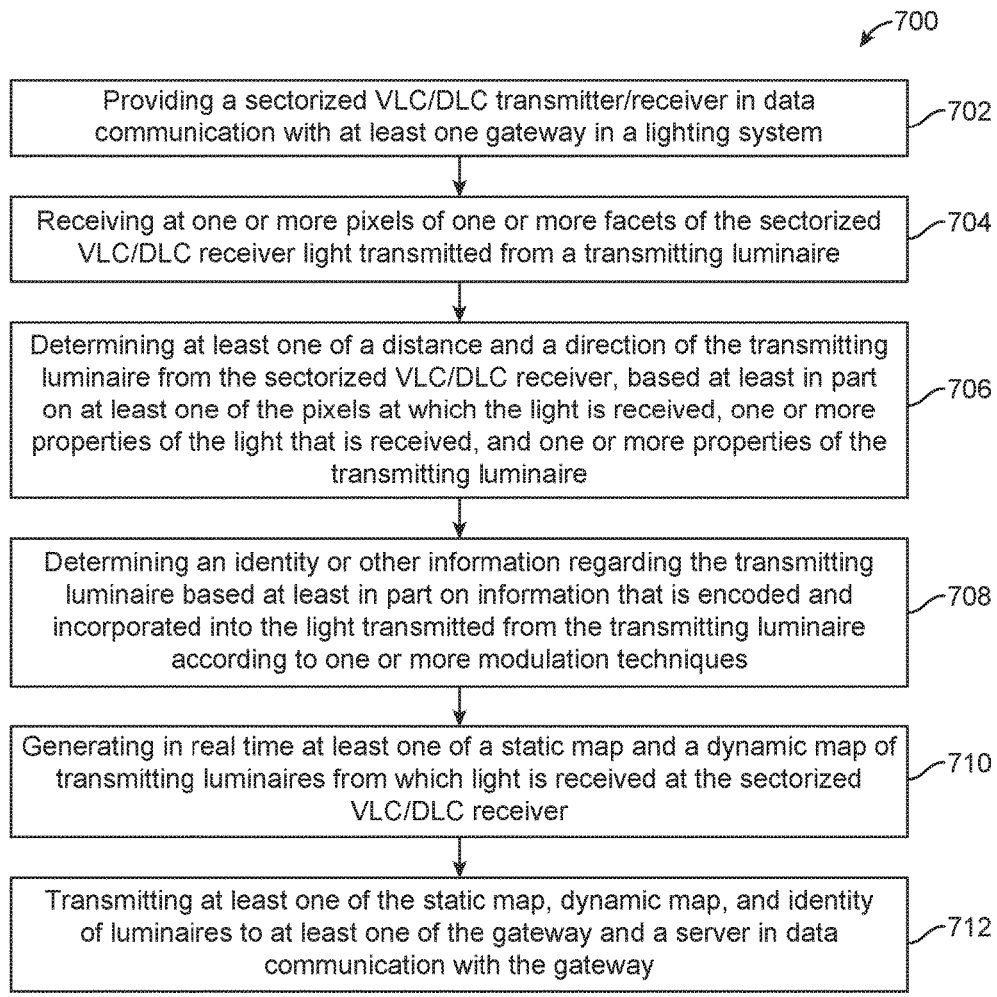
FIG. 8 is a flowchart illustrating a method according to an exemplary embodiment.

FIG. 8 illustrates an exemplary method 700 for configuring and determining with one or more sectorized VLC/DLC receivers a distance and a direction of each transmitting luminaire from which light is received at each sector of the respective VLC/DLC receiver. According to an aspect, system 100 (FIG. 1) may be configured to perform the high-level operations shown in FIG. 8 via at least one of the sensor subsystem 108, the gateway 102, and the server 106. The exemplary method 700 allows the system 100 to identify and locate luminaires in an environment using sectorized VLC/DLC communication, and thereby map the respective locations of identified luminaires to enable sectorized communication between the luminaires. At step 702, a sectorized VLC/DLC transmitter/receiver according to this disclosure is provided in data communication with at least one of the gateway 102 and the sectorized VLC/DLC control 110 of the system 100. Next, at step 704, light that is transmitted from one or more transmitting luminaires within an environment of the sectorized VLC/DLC receiver is received at one or more pixels of one or more facets of the sectorized VLC/DLC receiver. A distance and a direction of the transmitting luminaire from the sectorized VLC/DLC receiver may be determined at step 706, based at least in part on at least one of the particular pixels that receive the light transmitted from the transmitting luminaire, the intensity of the light that is received at the pixels, the actual intensity of the light that is transmitted from the transmitting luminaire, environment conditions such as ambient light, and a dimming level of the transmitting luminaire. In addition, at step 708, an identity or other information regarding the transmitting luminaire may be determined from information that is encoded and incorporated into the light transmitted from the transmitting luminaire according to one or more modulation techniques. As shown in step 710, the information described above regarding the identity and the location of the transmitting luminaire(s) may be continuously or periodically used to generate in real time at least one of a static map and a dynamic map of luminaire identities and locations, and may be transmitted to at least one of the gateway and a server to enable sectorized VLC/DLC communication between the luminaires in the environment.

The method 700 according to FIG. 8 and described above is an exemplary disclosed embodiment of a method for enabling sectorized VLC/DLC communication. However, the method need not necessarily be performed in the disclosed order, nor must each individual step be included in the method.

At the sectorized VLC/DLC transmitter side of a transmitting luminaire, information or data regarding the luminaire may be transmitted to identify either the luminaire or the information or data regarding the transmitting luminaire, using at least one of the sectorized VLC/DLC modulation techniques. At the sectorized VLC/DLC receiver side of a receiving sensor, the information or data sensed is used to identify the distance and direction of the transmitting luminaire from the receiving sensor. As previously discussed, low power from the transmitting luminaire may indicate that the luminaire is at a farther distance. High power from the transmitting luminaire may indicate that the luminaire is at a shorter or closer distance. In one embodiment, the VLC/DLC transmitter transmits information regarding the light intensity for the transmitted signal, thereby providing the receiving sensor with additional information for determining the distance of the transmitting luminaire and differentiating between two luminaires or transmission sources at different distances. The information included in the light transmission also helps luminaire devices locate each other and the direction from which a light transmitting message is sent. The sectorized VLC/DLC transmitter can include in the light transmission information regarding the sectorized direction of the transmission or the sector identification of the transmitter, to provide the VLC/DLC receiver with additional information regarding the direction of the transmitter. The distance, or relative distance, of the transmitting luminaire from the receiving VLC/DLC sensor may also be determined using multiple dimming levels in the transmission, including with the light transmission message information regarding the dimming level. The sectorized receiver uses the dimming level to gage the relative distance to the luminaire device.

Figure 9:
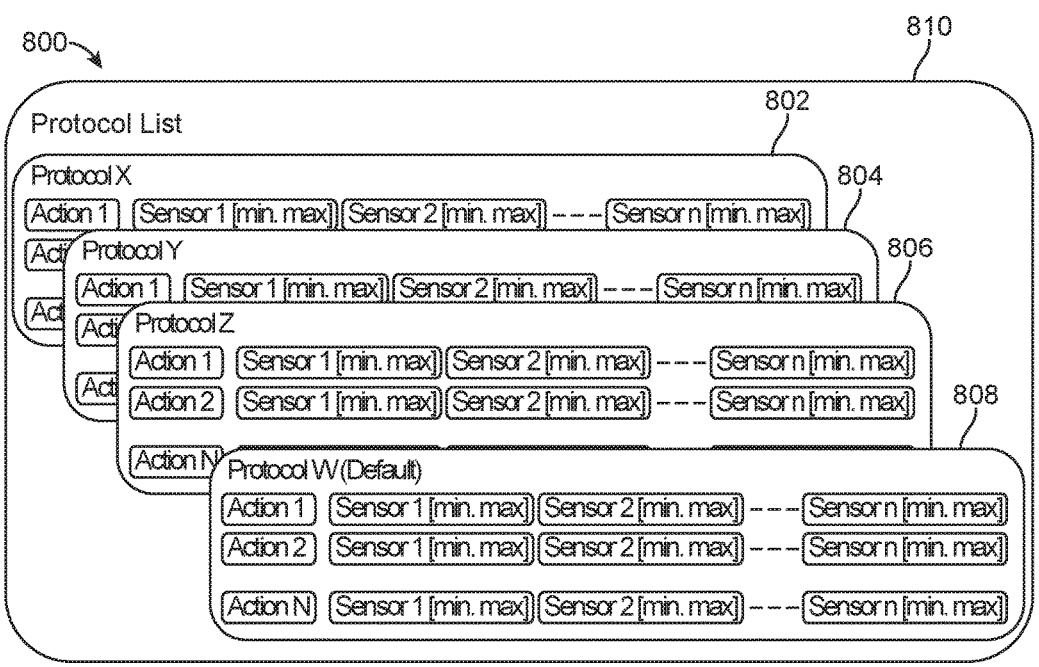
FIG. 9 is a diagram illustrating a list of protocols, according to an aspect; and, FIG. 10 is a perspective view of a mobile device, according to an aspect.

FIG. 9 illustrates an exemplary embodiment 800 of a protocol list data structure 810 for the gateway 102. The data structure 810 may be designed such that it is easy to traverse the protocol options and pick the correct protocol during the discovery process. The protocol list includes N protocols, where N can be any number. In an embodiment, each protocol (X 802, Y 804, Z 806 . . . W 808) contains directives to the gateway 102 to setup the specific protocol interface (e.g., power level, specific line connections, and other required information as dictated by the protocol standard interface). Further, each protocol may contain a set of directives/actions numbered 1-N. The discovery process may use these directives to take actions like sending a message or changing the voltage level over the dimming control lines. According to an aspect, each action in the list is associated with a list of sensor measurement ranges, one per sensor and per power meter. These measurement ranges may be compared with actual readings as part of the dimming protocol discovery process. In an embodiment, at least one of the protocols, without limitation, can be marked as a default protocol W 808. According to an aspect, this is the protocol to which the gateway 102 will default into when no other protocol is discovered.

Figure 10:
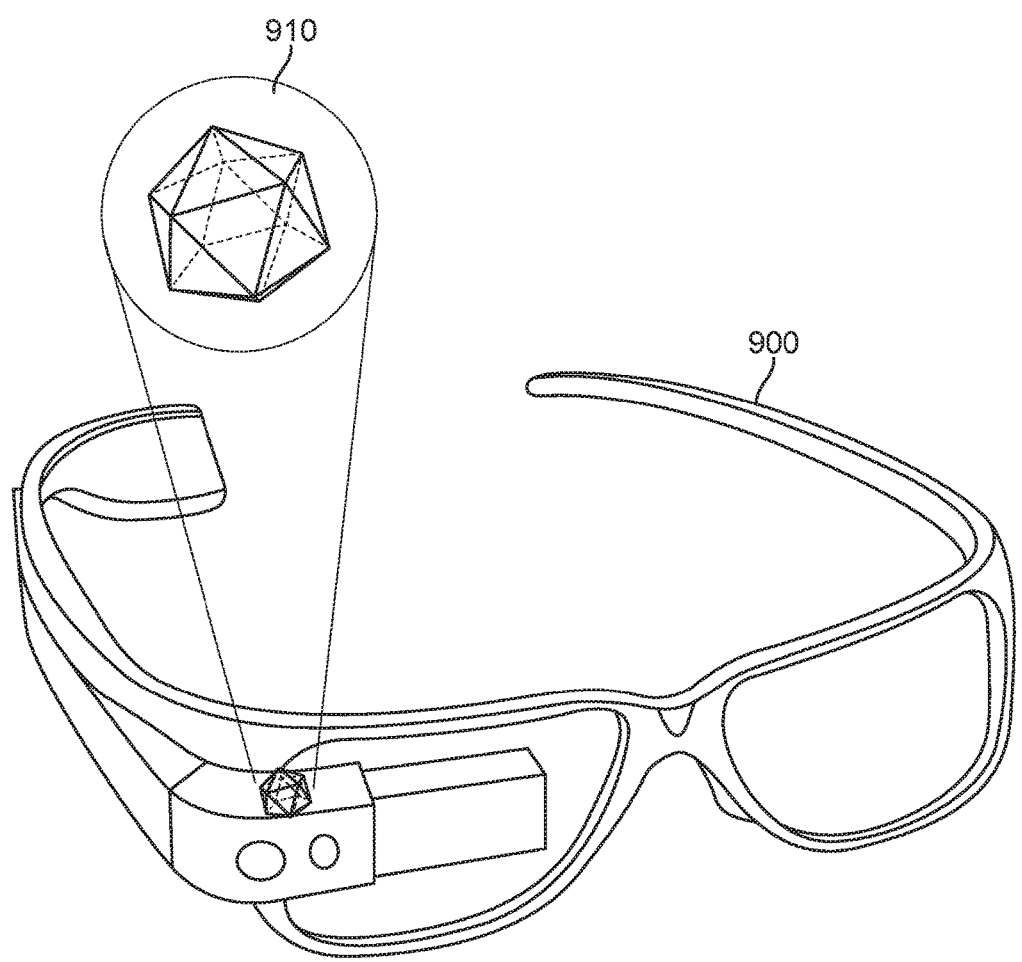

FIG. 10 is an example of a mobile device 900 incorporating a mobile sectorized VLC/DLC receiver 910. In the exemplary embodiment shown in FIG. 10, the mobile device 900 is a pair of glasses and the sectorized VLC/DLC receiver 910 is an icosahedron-shaped sectorized VLC/DLC receiver. In other embodiments, the mobile device may be a computing device such as laptop, palmtop, desktop, or handheld electronic device such as mobile phone, smartphone, tablet, or other wearable device such a smart watch. In still further embodiments, the mobile device may be any mobile device within the spirit and scope of this disclosure.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The system and method have been described above, with reference to specific embodiments; it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

The present disclosure, in various embodiments, configurations and aspects, includes components, methods, processes, systems and/or apparatus substantially depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects, for the purpose of streamlining the disclosure. The features of the embodiments, configurations, or aspects of the present disclosure, may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A sectorized Visual Light Communication (VLC)/Dark Light Communication (DLC) sensor, comprising:
    a plurality of surface facets, wherein each of the plurality of surface facets is oriented in a specific direction and angle with respect to the sectorized VLC/DLC sensor and other surface facets of the plurality of surface facets,
    wherein each of the plurality of surface facets includes a distribution of pixels within a photosensitive area of the surface facet, and
    wherein the sectorized VLC/DLC sensor is configured to determine a direction and a distance of one or more transmitting light sources based on receiving light transmitted from the one or more transmitting light sources at the distribution of pixels.

2. The sectorized VLC/DLC sensor of claim 1, wherein the sectorized VLC/DLC sensor is configured to distinguish the direction and the distance of the one or more transmitting light sources based on the distribution of pixels that receive the light transmitted from each of the one or more transmitting light sources and an intensity of the light that is received by the distribution of pixels.

3. The sectorized VLC/DLC sensor of claim 2, wherein the sectorized VLC/DLC sensor is configured to receive information regarding the one or more transmitting light sources based on the transmitted light from the one or more transmitting light sources using a light transmission modulation technique.

4. The sectorized VLC/DLC sensor of claim 3, wherein the information regarding the one or more transmitting light sources includes at least one of an identity, a location, a color content, a dimming level, and the intensity of the light from the one or more transmitting light sources.

5. The sectorized VLC/DLC sensor of claim 4, wherein the sectorized VLC/DLC sensor is configured to determine the distance and the direction of the one or more transmitting light sources based on the information regarding the one or more transmitting light sources.

6. The sectorized VLC/DLC sensor of claim 4, wherein the information regarding the one or more transmitting light sources includes information regarding light sources that have been previously identified.

7. The sectorized VLC/DLC sensor of claim 6, wherein the sectorized VLC/DLC sensor is configured to transmit the information regarding the one or more transmitting light sources to a server for generating a layout of neighboring light sources based on the transmitted information.

8. The sectorized VLC/DLC sensor of claim 1, wherein a first of the plurality of surface facets is configured to communicate with a second of the surface facets of the plurality of surface facets regarding the transmitted light received at the distribution of pixels and an intensity of the transmitted light.

9. The sectorized VLC/DLC sensor of claim 1, wherein the sectorized VLC/DLC sensor is one of dodecahedron, icosahedron, triangularly-based pyramid, cube, and square-based shaped.

10. A system for automatic luminaire location identification and group assignment, comprising:
    a gateway for transmitting information to a server; and
    a sectorized Visual Light Communication (VLC)/Dark Light Communication (DLC) sensor,
    wherein the sectorized VLC/DLC sensor includes a plurality of surface facets, wherein each facet of the plurality of surface facets is oriented in a specific direction and angle with respect to the sectorized VLC/DLC sensor and other surface facets of the plurality of surface facets,
    wherein each surface facet of the plurality of surface facets includes a distribution of pixels within a photosensitive area,
    wherein the sectorized VLC/DLC sensor is configured to transmit information associated with light that is received at the distribution of pixels from a transmitting light source to the gateway, the transmitted information associated with the distribution of pixels that receive the light and an intensity of the light that is received by the distribution of pixels,
    wherein the gateway is configured to transmit the information to the server to determine a location of the transmitting light source based on the transmitted information.

11. The system of claim 10, wherein the sectorized VLC/DLC sensor is configured to distinguish a direction and a distance of the transmitting light source from the sectorized VLC/DLC light sensor based on the distribution of pixels that receive the transmitted light.

12. The system of claim 11, wherein the distance and the direction of the transmitting light source is determined based on the transmitted information.

13. The system of claim 10, wherein the transmitted information further comprises at least one of an identity, location, color content, and dimming level of the transmitting light source.

14. The system of claim 10, wherein the transmitted information further includes information regarding light sources that have been previously identified.

15. The system of claim 10, wherein the server is configured to generate a layout of neighboring light sources based on the transmitted information.

16. The system of claim 10, wherein a first of the plurality of surface facets is configured to communicate the transmitted information with a second surface facets of the plurality of surface facets.

17. The system of claim 10, wherein the sectorized VLC/DLC sensor is one of dodecahedron, icosahedron, triangularly-based pyramid, cube, and square-based shaped.

18. A method of automatic luminaire location identification, comprising:
   receiving light transmitted from one or more transmitting light sources at a sectorized Visual Light Communication (VLC)/Dark Light Communication (DLC) sensor, wherein
   the sectorized VLC/DLC sensor includes a plurality of surface facets,
   each of the plurality of surface facets is oriented in a specific direction and angle with respect to the sectorized VLC/DLC sensor and other facets of the plurality of surface facets, and
   each facet of the plurality of surface facets includes a distribution of pixels within a photosensitive area of the facet;
   transmitting information regarding light received at the distribution of pixels from the sectorized VLC/DLC sensor to a gateway; and
   transmitting, via the gateway, the information regarding light received at the distribution of pixels to a server wherein the server is configured to determine a location of the one or more transmitting light sources based on the transmitted information.

19. The method of claim 18, wherein the information regarding light transmitted from the transmitting light source comprises at least one of an identity, a location, a color content, a dimming level, and a light intensity of the transmitting light source based on a light transmission modulation technique.

20. The method of claim 18, further comprising:
   generating a map of the locations of the one or more transmitting light sources to enable communication between the sectorized VLC/DLC sensor and the one or more transmitting light sources.

* * * * *